United States Patent
Tan et al.

(10) Patent No.: US 12,052,572 B2
(45) Date of Patent: Jul. 30, 2024

(54) SERVER COMPUTER AND METHOD FOR VERIFYING A LOCATION OF A USER DEVICE

(71) Applicant: GRABTAXI HOLDINGS PTE. LTD., Singapore (SG)

(72) Inventors: Sien Yi Tan, Singapore (SG); Philipp Wolfgang Josef Kandal, Singapore (SG); Kok Wing Ham, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/256,701

(22) PCT Filed: Mar. 23, 2022

(86) PCT No.: PCT/SG2022/050159
§ 371 (c)(1),
(2) Date: Jun. 9, 2023

(87) PCT Pub. No.: WO2022/203604
PCT Pub. Date: Sep. 29, 2022

(65) Prior Publication Data
US 2023/0397010 A1    Dec. 7, 2023

(30) Foreign Application Priority Data
Mar. 23, 2021   (SG) ............................ 10202103005U

(51) Int. Cl.
*H04W 12/63* (2021.01)
*H04W 12/06* (2021.01)
(52) U.S. Cl.
CPC ........... *H04W 12/63* (2021.01); *H04W 12/06* (2013.01)
(58) Field of Classification Search
None
See application file for complete search history.

(56) References Cited

U.S. PATENT DOCUMENTS 10,467,327 B1   11/2019  Arazi
10,951,668 B1 *  3/2021  Cabanero .............. H04W 4/023
(Continued)

FOREIGN PATENT DOCUMENTS

CN         109815690 A       5/2019

OTHER PUBLICATIONS

Jan, S.U. and Khan, H.U., 2021. Identity and aggregate signature-based authentication protocol for IoD deployment military drone. IEEE Access, 9, pp. 130247-130263. (Year: 2021).*

(Continued)

*Primary Examiner* — Luu T Pham
*Assistant Examiner* — Edward X Long
(74) *Attorney, Agent, or Firm* — Buckley, Maschoff & Talwalkar LLC

(57) ABSTRACT

Aspects concern a server computer for verifying a location of a user device including a memory interface connected to a memory device that stores a database including verification and gathering questions, wherein each question of the verification and gathering questions is associated with a location, the database including an answer to each verification question and not including an answer to each gathering question; and a processing unit configured to: receive location data representing the location of the user device; select a verification question and a gathering question associated with the location of the user device; transmit the verification question and the gathering question to the user device and receive an answer to each of the verification and gathering question from the user device; if the answer provided by the user device to the verification question corresponds to the answer included in the database, verify the location of the user device.

14 Claims, 10 Drawing Sheets

(56) References Cited

U.S. PATENT DOCUMENTS

| | | | |
|---|---|---|---|
| 11,496,452 B2* | 11/2022 | Licht | ............... H04L 9/3271 |
| 2015/0161664 A1 | 6/2015 | Koppelmann | |
| 2016/0147826 A1 | 5/2016 | Mishra | |
| 2016/0378868 A1 | 12/2016 | Har-Noy et al. | |
| 2017/0004204 A1* | 1/2017 | Bastide | ............... G06F 16/3329 |
| 2017/0149758 A1 | 5/2017 | Uetabira | |
| 2017/0222962 A1* | 8/2017 | Gauglitz | ............... H04L 51/222 |
| 2019/0287184 A1 | 9/2019 | Arvapally et al. | |
| 2020/0092382 A1* | 3/2020 | Borkar | ............... H04L 67/142 |

OTHER PUBLICATIONS

Francis, L., Hancke, G., Mayes, K. and Markantonakis, K., 2011. Practical relay attack on contactless transactions by using NFC mobile phones. Cryptology ePrint Archive. (Year: 2011).*

International Search Report and Written Opinion dated Jul. 4, 2022 which was issued in connection with PCT/SG2022/050159, 8 pages.

"The Singapore Search Report" dated Oct. 21, 2021 which was issued in connection with SG Patent Application No. 10202103005U, 2 pages.

"The Singapore Examination Report" dated Aug. 18, 2022 which was issued in connection with SG Patent Application No. 10202103005U, 2 pages.

Supplementary European Search Report dated Jan. 29, 2024 which was issued in connection with EP Patent Application No. 22776246.

Gummidi Srinivasa Raghavendra Bhuvan Gumuhb@CS AAU DK et al: "A Survey of Spatial Crowdsourcing", ACM Transactions on Database Systems, ACM, New York, NY, US, vol. 44, No. 2, Mar. 15, 2019 (Mar. 15, 2019), pp. 1-46, XP058682568, ISSN: 0362-5915, DOI: 10.1145/3291933 * Section 10 Truth Discovery and Crowdsourced Data Aggregation.

* cited by examiner

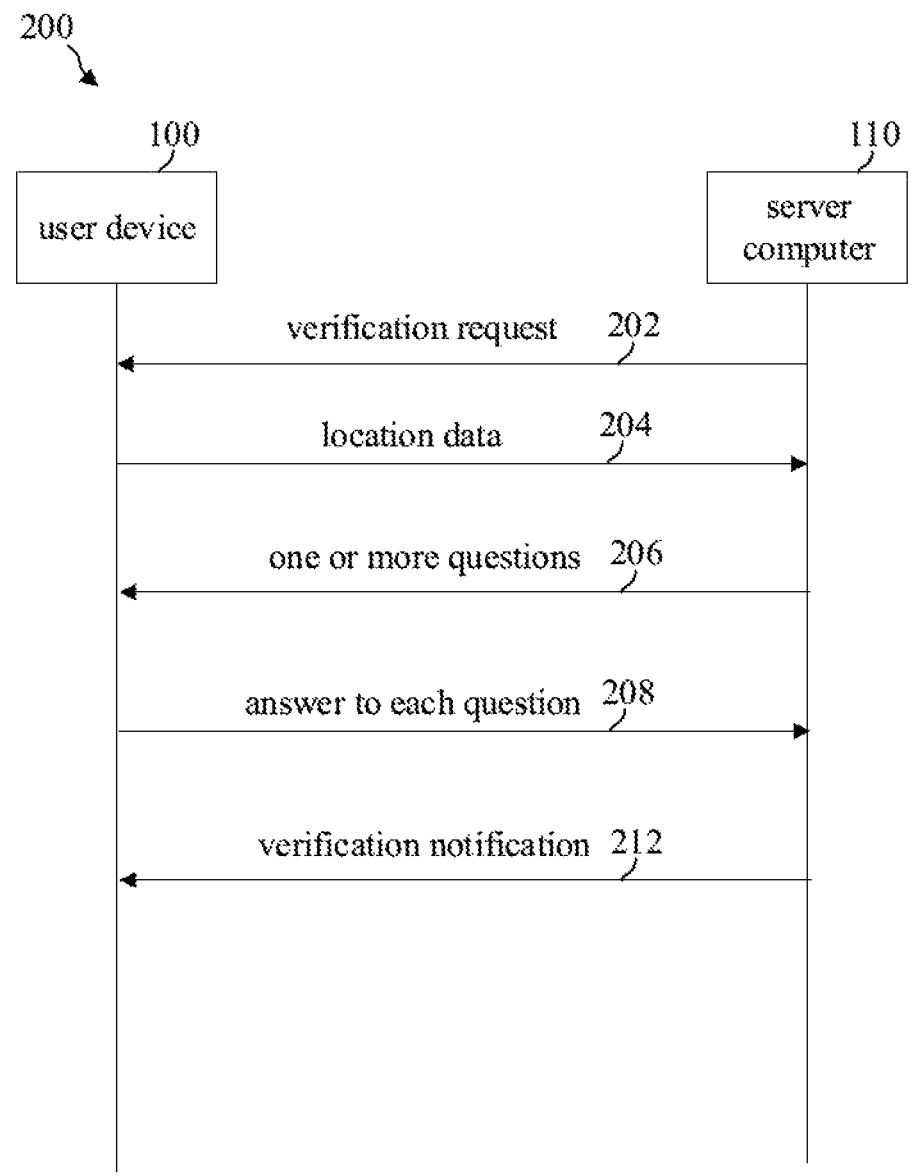

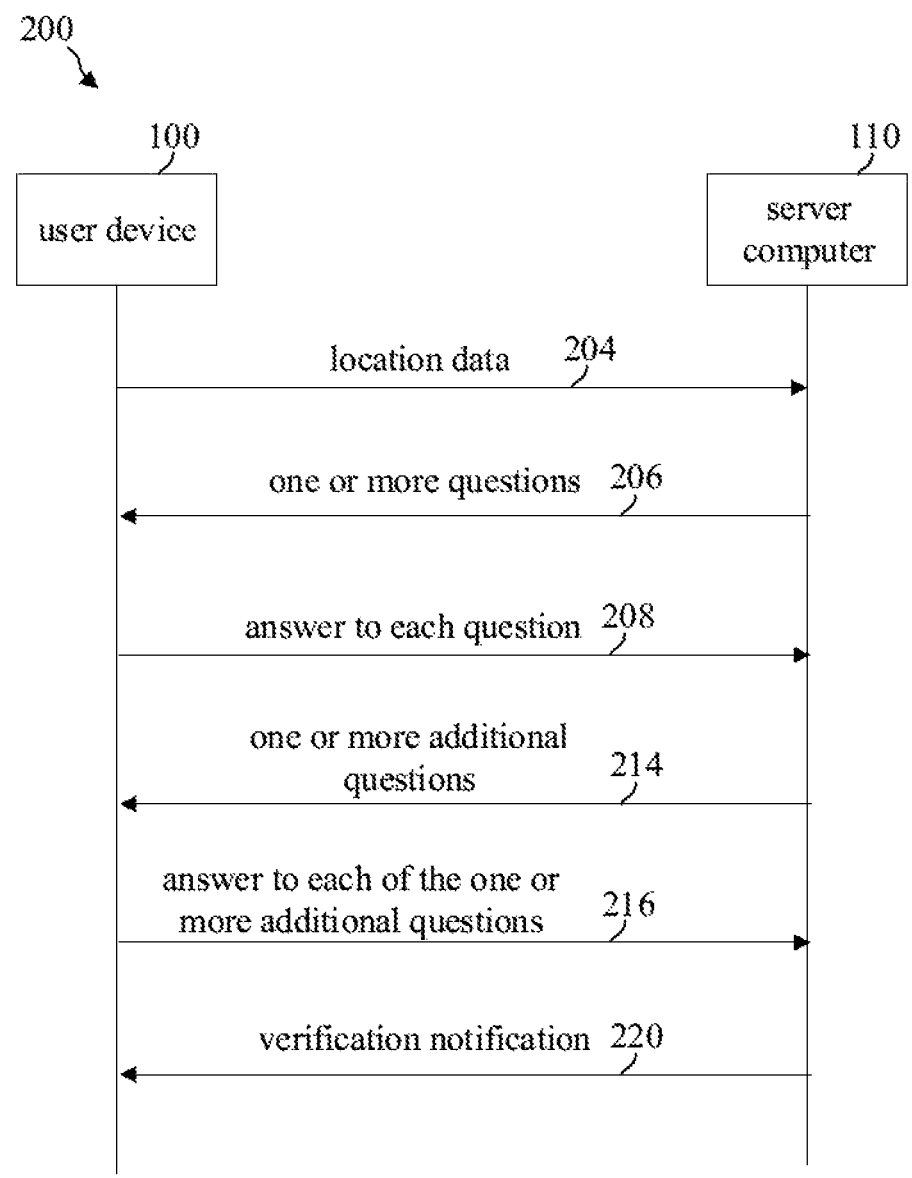

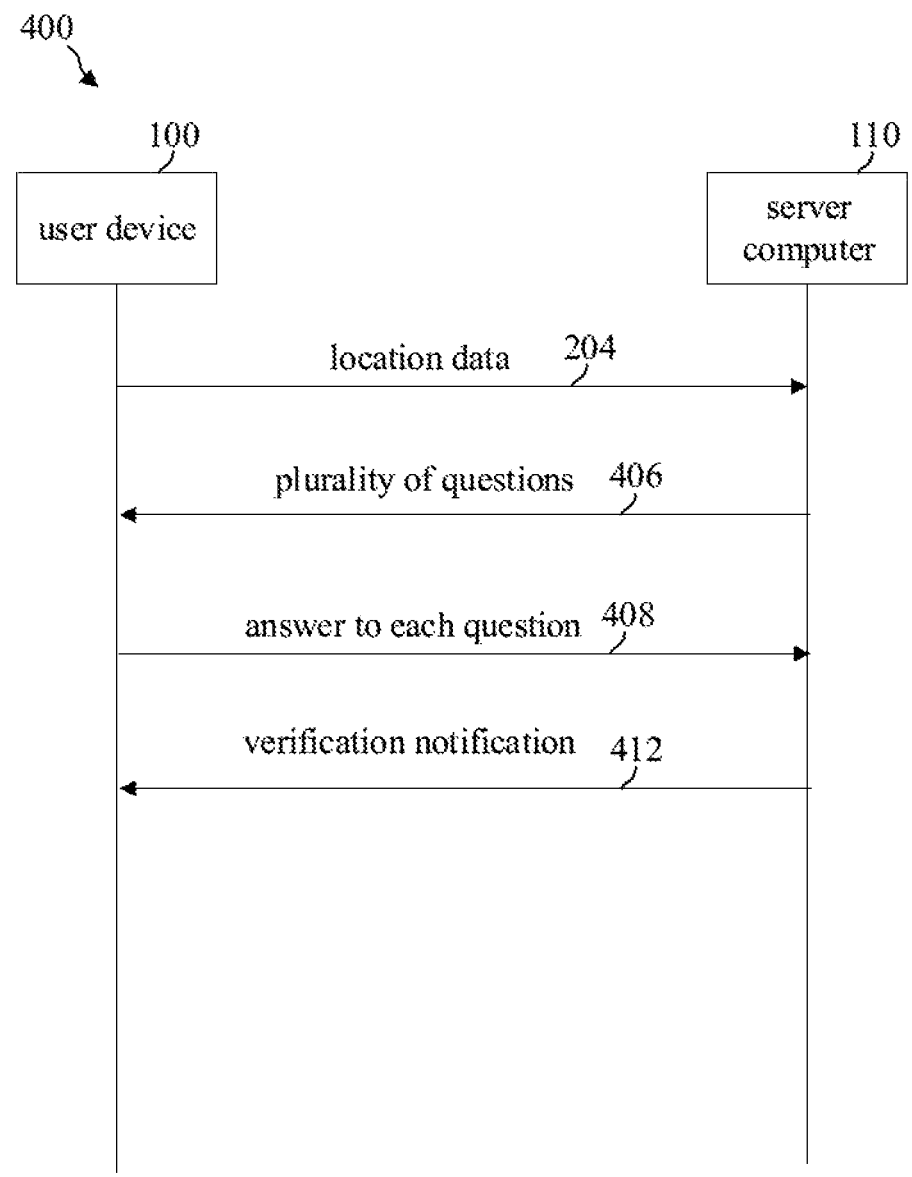

SERVER COMPUTER AND METHOD FOR VERIFYING A LOCATION OF A USER DEVICE

The present invention is a 371 of International Application No. PCT/SG2022/050159, filed on Mar. 23, 2022, and claiming priority to Singapore Application No. 10202103005U filed on Mar. 23, 2021, incorporated by reference herein in its entirety.

TECHNICAL FIELD

Various aspects of this disclosure relate to a server computer and a method for verifying a location of a user device.

BACKGROUND

Map data may include various information, such as points of interest, buildings, landmarks, restaurants, bars, gas stations, etc., which may be provided by users being at the respective place using, for example, a smartphone. However, since a user may be rewarded for providing these information, the user may fake the location of the smartphone and may provide fake information in order to obtain the reward. Accordingly, it is desirable to verify the location of the user to avoid fake information. For example, verification questions related to the location of the user may be asked to the user. Accordingly, it is desirable to gather these questions.

SUMMARY

Various embodiments relate to a server computer for verifying a location of a user device. The server computer may include: a memory interface connected to a memory device, the memory device configured to store a database including a plurality of verification questions and a plurality of gathering questions, wherein each question of the plurality of verification questions and the plurality of gathering questions is associated with a location of a plurality of locations, wherein the database includes an answer to each of the plurality of verification questions, and wherein the database does not include an answer to each of the plurality of gathering questions; a communication interface configured to receive data from the user device and to transmit data to the user device; a processing unit configured to: receive location data from the user device via the communication interface, the location data representing the location of the user device; select at least one verification question from the plurality of verification questions and at least one gathering question from the plurality of gathering questions associated with the location of the user device represented by the location data from the database via the memory interface; transmit the at least one verification question and the at least one gathering question to the user device and receive an answer provided by the user device to each of the at least one verification question and the at least one gathering question from the user device via the communication interface; for the at least one verification question, determine if the answer provided by the user device corresponds to the answer included in the database; and if the answer provided by the user device to the at least one verification question corresponds to the answer of the at least one verification question included in the database, verify the location of the user device represented by the received location data and store the answer provided by the user device to the at least one gathering question in the database of the memory device in association with the at least one gathering question.

According to various embodiments, the plurality of verification questions and/or the plurality of gathering questions may include one or more questions regarding an attribute of a map (e.g., an attribute of the map in the surrounding of the user device). An attribute of a map may be or may include, for example, a name of a street, whether a specific mailbox exists, and/or any attribute of a point of interest. An attribute of a point of interest may be or may include, for example, a name of a point of interest, a location of a point of interest, a popularity of a point of interest, an item on a menu (e.g. in a restaurant), a price of an item on a menu, opening times, price of parking per hour, an indoor direction between two points of interest, an outdoor direction between points of interest, if indoor seating is possible, if outdoor seating is possible, if credit cards are accepted, if debit cards are accepted, etc.

According to various embodiments, the processing unit may be configured to: if the answer provided by the user device to the at least one verification question corresponds to the answer of the at least one verification question included in the database, store the answer provided by the user device to the at least one gathering question as a preliminary gathering answer in the database via the memory interface; determine, if other preliminary gathering answers included in the database of the memory device in association with the at least one gathering question and provided by other users are similar to the preliminary gathering answer; if other preliminary gathering answers associated with the at least one gathering question are similar to the preliminary question, determine, if a weighted number of similar preliminary gathering answers is above a threshold value; and if the determined weighted number of similar preliminary gathering answers is above the threshold value, store the preliminary gathering answer via the memory interface as an answer associated with the at least one gathering question in the database in association with the at least one gathering question.

According to various embodiments, the processing unit may be further configured to: if the answer provided by the user device to the at least one verification question does not correspond to the answer of the at least one verification question included in the database: select one or more additional questions associated with the location of the user device represented by the location data from the database via the memory interface, wherein the one or more additional questions include at least one additional verification question selected from the plurality of verification questions; transmit the one or more additional questions to the user device and receive an answer provided by the user device to each of the one or more additional questions from the user device via the communication interface; for the at least one additional verification question, determine, if the answer provided by the user device corresponds to the answer included in the database; and if the answer provided by the user device to the at least one additional verification question corresponds to the answer of the at least one additional verification question included in the database, verify the location of the user device represented by the received location data.

According to various embodiments, the processing unit may be further configured to: if the answer provided by the user device to the at least one additional verification question corresponds to the answer of the at least one additional verification question included in the database, store the answer provided by the user device to the at least one gathering question via the memory interface in the database of the memory device in association with the at least one gathering question.

According to various embodiments, the processing unit may be configured to: if the answer provided by the user device to the at least one additional verification question corresponds to the answer of the at least one additional verification question included in the database, store the answer provided by the user device to the at least one gathering question via the memory interface as a preliminary gathering answer in the database of the memory device; determine, if other preliminary gathering answers included in the database in association with the at least one gathering question and provided by other users are similar to the preliminary gathering answer; if other preliminary gathering answers associated with the at least one gathering question are similar to the preliminary gathering answer, determine, if a weighted number of similar preliminary gathering answers is above a first threshold value; and if the determined weighted number of similar preliminary gathering answers is above the first threshold value, store the preliminary gathering answer as an answer associated with the at least one gathering question via the memory interface in the database of the memory device.

According to various embodiments, the one or more additional questions may further include at least one additional gathering question selected from the plurality of gathering questions and the processing unit may be further configured to: if the answer provided by the user device to the at least one additional verification question corresponds to the answer of the at least one additional verification question included in the database, store the answer provided by the user device to the at least one additional gathering question via the memory interface in the database of the memory device in association with the at least one additional gathering question.

According to various embodiments, the processing unit may be configured to: if the answer provided by the user device to the at least one additional verification question corresponds to the answer of the at least one additional verification question included in the database, store the answer provided by the user device to the at least one additional gathering question via the memory interface as a preliminary gathering answer in the database of the memory device; determine, if other preliminary gathering answers included in the database in association with the at least one additional gathering question and provided by other users are similar to the preliminary gathering answer; if other preliminary gathering answers associated with the at least one additional gathering question are similar to the preliminary gathering answer, determine, if a weighted number of similar preliminary gathering answers is above a first threshold value; and if the determined weighted number of similar preliminary gathering answers is above the first threshold value, store the preliminary gathering answer as an answer associated with the at least one additional gathering question in the database of the memory device.

According to various embodiments, the processing unit may be configured to: if the answer provided by the user device to the at least one additional verification question corresponds to the answer of the at least one additional verification question included in the database, store the answer provided by the user device to the at least one verification question via the memory interface as a preliminary verification answer in the database of the memory device; determine, if other preliminary verification answers included in the database in association with the at least one verification question and provided by other users are similar to the preliminary verification answer; if other preliminary verification answers associated with the at least one verification question are similar to the preliminary verification answer, determine, if a weighted number of similar preliminary verification answers is above a second threshold value; and if the determined weighted number of similar preliminary verification answers is above the second threshold value, store the preliminary verification answer as an answer associated with the at least one verification question via the memory interface in the database of the memory device.

According to various embodiments, the processing unit may be configured to: store the preliminary verification answer as an answer associated with the at least one verification question in the database of the memory device such that the answer currently included in the database in association with the at least one verification question is replaced with the answer to the at least one verification question received from the user device.

According to various embodiments, the processing unit may be further configured to: if the answer provided by the user device to the at least one additional verification question does not correspond to the answer of the at least one additional verification question included in the database, transmit a rejection notification to the user device rejecting a requested verification of the location of the user device or transmit one or more other verification questions of the plurality of verification questions associated with the location of the user device to the user device via the communication interface.

According to various embodiments, the processing unit may be further configured to: if the location of the user device is verified, transmit a verification notification to the user device via the communication interface verifying the location of the user device represented by the received location data.

According to various embodiments, the plurality of verification questions and/or the plurality of gathering questions included in the database may include one or more of a dichotomous question, a multiple choice question, a checkbox question, a slider question, a question which involves taking a photo using the user device, and/or a type-in question (e.g., a comment box question).

According to various embodiments, a system may include the server computer according to one or more of the above embodiments and a user device. The user device may include a positioning sensor configured to acquire the location data; a communication interface configured to transmit the location data to the server computer and to receive the respective questions from the server computer; and a user interface configured to provide the received questions to a user using the user device and to receive the answers provided by the user.

Various embodiments relate to a method for verifying a location of a user device using a server computer. The method may include: the server computer receiving location data from the user device, the location data representing the location of the user device; the server computer transmitting a plurality of questions associated with the location data to the user device, wherein the server computer stores a database including each of the plurality of questions, the plurality of questions including at least one verification question and at least one gathering question, wherein the database includes an answer to the at least one verification question, and wherein the database does not include an answer to the at least one gathering question; the server computer receiving an answer to each of the plurality of questions from the user device; for the at least one verification question of the plurality of questions, the server computer determining if the answer provided by the user device corresponds to the answer included in the database; and if the answer provided by the user device to the at least one verification question corresponds to the answer of the at least one verification question included in the database, the server computer verifying the location of the user device represented by the received location data and storing the answer provided by the user device to the at least one gathering question in the database in association with the at least one gathering question.

According to various aspects, a computer program element may include program instructions, which, when executed by one or more processors, cause the one or more processors to perform the method of the above embodiment.

According to various aspects, a computer-readable medium may include program instructions, which, when executed by one or more processors, cause the one or more processors to perform the method of the above embodiment.

BRIEF DESCRIPTION OF THE DRAWINGS

The invention will be better understood with reference to the detailed description when considered in conjunction with the non-limiting examples and the accompanying drawings, in which:

FIG. 2A, FIG. 2B, and FIG. 2C each show an exemplary communication system between the user device and the server computer for verifying a location of the user device.

FIG. 4A and FIG. 4B each show an exemplary communication system between the user device and the server computer for verifying a location of the user device.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a method are analogously valid for a server computer and/or a user device, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

As used herein and in accordance with various embodiments, the expression "method for" may also include the meaning of "method of".

As used herein, the term "location data" may include geographical data, for example GPS data, within a geographical perimeter. The geographical perimeter may represent a perimeter on earth's surface. The location data may include a geospatial coordinate and may further include a time, for example, as provided by the global positioning system GPS. The GPS coordinates may according to the World Geodetic System, WGS 84, for example, version G1674. As used herein and in accordance with various embodiments, the terms "geographical" and "geospatial" may be used interchangeably.

In the following, embodiments will be described in detail.

Since a user using a smartphone may fake the location of the smartphone, it may be desirable to verify the location of the smartphone. Various aspects relate to a server computer and a method capable to verify a location of a user device, such as a smartphone.

Figure 1A:
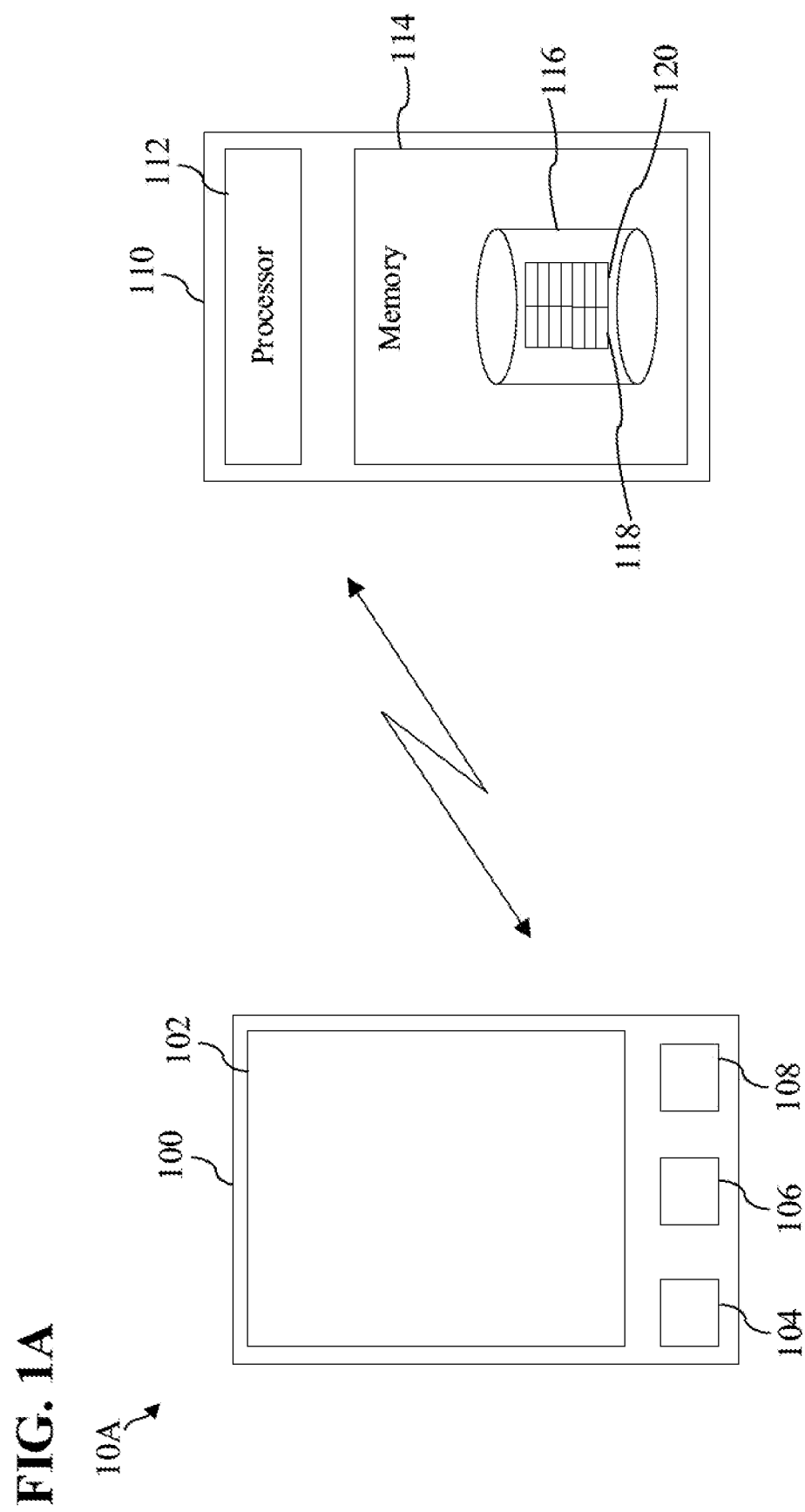
FIG. 1A and FIG. 1B each show a communication arrangement including a user device and a server computer.
Figure 1B:
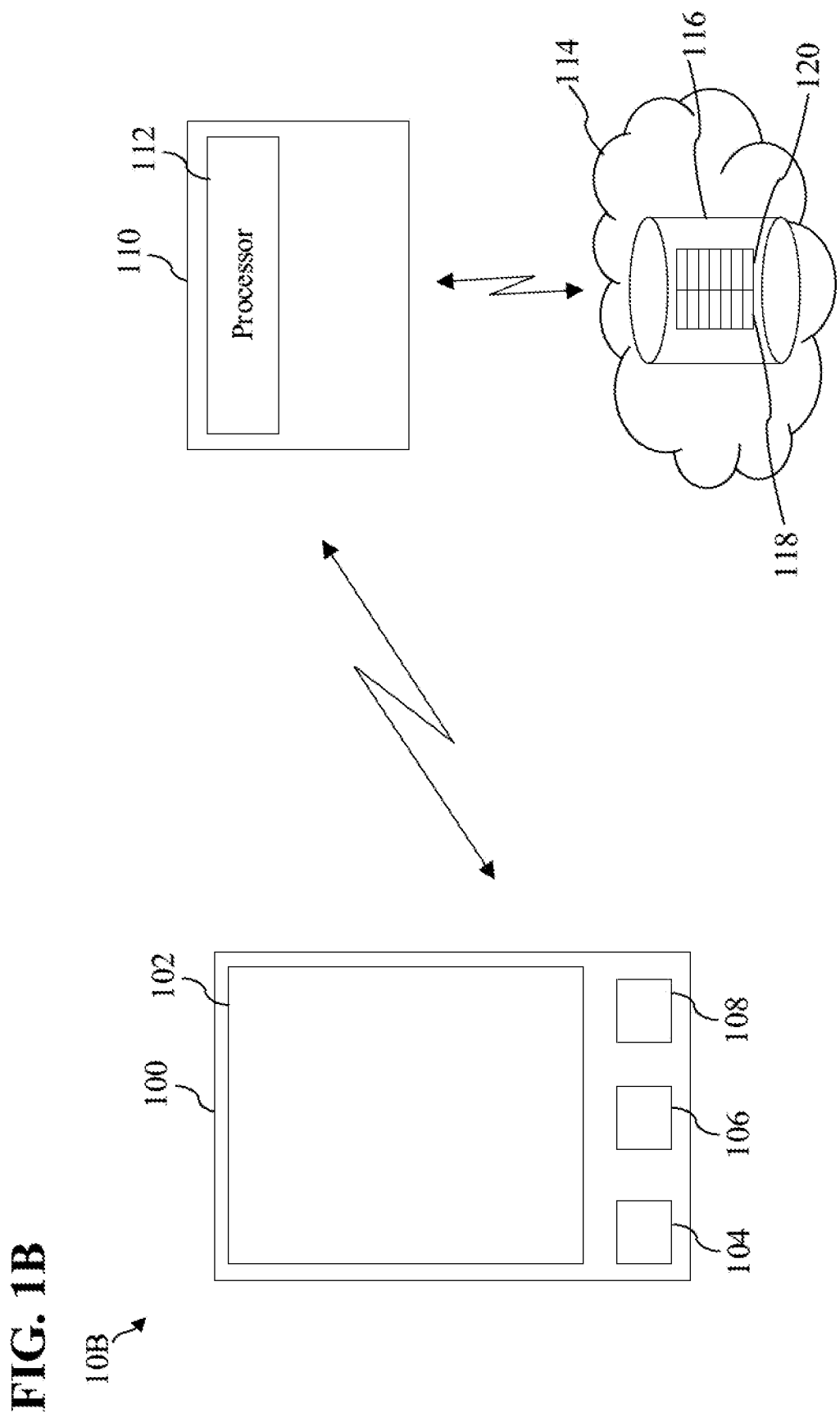

FIG. 1A shows a communication arrangement 10A including a user device 100 and a server computer 110, according to various aspects. FIG. 1B shows a communication arrangement including the user device 100 and the server computer 110, according to various aspects.

The user device 100 (in some aspects also referred to as user terminal) may be any kind of device operable by a user, such as a personal computer, a laptop, a smartphone, a tablet, a smartwatch, etc. In particular, a user device may be a mobile device, such as a smartphone or a tablet. Hence, the user device 100 may be a mobile device.

The user device 100 may include a processing unit 104 (e.g., including one or more processors) configured to perform one or more operations described herein. The user device 100 may include a memory 106 configured to store data used with reference to the processing described herein. According to various aspects, the processing unit 104 may perform the processes described herein using the memory 106. The processing unit 104 may be provided with the data used to perform the processes described herein via a communication interface.

The user device 100 may include a user interface 102. For example, the user interface 102 may include a visual user interface and the user device 100 may include a screen providing information to a user using the user device 100. For example, the user interface 102 may include an aural user interface and the user device 100 may include one or more speakers providing information to the user. Illustratively, the user device 100 may be any kind of device enabling a user to communicate with the server computer 110. The user interface 102 may be further configured to receive information (e.g., commands) from the user.

According to various aspects, the screen of the user device 100 may show a graphical user interface (GUI) of an app that the user of the user device 100 has previously installed on the user device and has opened (i.e. started) to the app. The communication between the user device 100 and the server computer 110, as described herein, may be performed via the app.

According to various aspects, the user device 100 may include at least one positioning sensor 108. The positioning sensor 108 may be configured to provide location data. The positioning sensor 108 may be, for example, a GPS sensor configured to provide GPS data as location data.

The user device 100 may wirelessly communicate with the server computer 110. The user device 100 may communicate with the server computer 110 via a radio connection. According to various aspects, the user device 100 may communicate indirectly with the server computer 110. For example, the user device 100 may communicate via the radio connection with a base station or a WiFi terminal and the base station or WiFi terminal may forward packages from the user device 100 to the server computer 110, or vice versa. According to various aspects, the user device 100 may include a communication interface configured to communicate with the server computer 110 via the radio connection (e.g., indirectly via a base station, a WiFi terminal, etc.). According to various aspects, the server computer 110 may include a communication interface configured to communicate with the user device 100.

The server computer 110 (in some aspects also referred to as server terminal) may include a communication interface. The communication interface may be configured to communicate with the user device 100. The communication interface may be configured to receive data from the user device 100 and to transmit data to the user device 100. According to various aspects, the server computer 110 may be located at a location different from a location of the user device 100. Illustratively, the server computer 110 may rely on information (e.g., location data) provided by the user device 100 regarding the location of the user device 100. According to various aspects, a time between data are sent from the user device 100 and received by the server computer 110 (e.g., between their respective communication interfaces), or vice versa, may be less than a time constraint of ten seconds (e.g., less than two seconds, e.g., less than one second). Illustratively, the user device 100 and the server computer 110 may be located at different locations and the data may be communicated between the user device 100 and the server computer 110 within the above described time constraint (sometimes referred to as real-time).

The server computer 110 may include at least one processor 112. The processor 112 may be configured to perform one or more processes described herein with reference to the server computer 110. According to various aspects, the server computer 110 may include a processing unit, wherein the processing unit may include the processor 112.

In an embodiment, a "computer" may be understood as any kind of a logic implementing entity, which may be hardware, software, firmware, or any combination thereof. Thus, in an embodiment, a "computer" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "computer" may also be software being implemented or executed by a processor, e.g. any kind of computer program, e.g. a computer program using a virtual machine code such as e.g. Java. Any other kind of implementation of the respective functions which will be described in more detail below may also be understood as a "computer" in accordance with an alternative embodiment.

The server computer 110 may include a memory interface configured to provide access to a memory 114 (in some aspects referred to as memory device). The memory interface may be connected (e.g., wirelessly and/or hard-wired connected) to the memory 114. The memory interface may be configured to communicate with the memory 114 (e.g., reading data stored in the memory 114, e.g., writing data to the memory 114). According to various aspects, the memory 114 may be a local memory of the server computer 110 (see, for example, FIG. 1A). According to various aspects, the memory 114 may be an external memory, such as a cloud, and the server computer 110 may be configured to access (e.g., communicate) with the external memory (see, for example, FIG. 1B).

According to various aspects, the memory 114 may store a (private) database 116. The database 116 may be a digital database. The database 116 may include questions 118. The database 116 may include answers 120 to a plurality of the questions 118. For example, an answer may be assigned to each question of the plurality of questions. Each question 118 included in the database 116 may be associated with a location. According to various aspects, the database 116 may, for each of the questions 118, include information if an answer to the respective question is accessible remotely (e.g., on the internet) or not. Illustratively, the information associated with a respective question may state if the answer to the question can only be solved (or is expected to only being solved) at the associated location. Thus, the database 116 may include questions 118, wherein each question may be associated with a location, information regarding an access of an answer to the question, and/or an answer to the question. Hence, the database 116 itself may also not be accessible publicly (i.e., the database 116 may be a private database). According to various aspects, each question 118 stored in the database 116 may be expected to not being accessible remotely. According to various aspects, the questions 118 may include a first group of questions (e.g., a first disjoint subset of questions) and a second group of questions (e.g., a second disjoint subset of questions different from the first disjoint subset). For example, the first group of questions may include all of the questions 118 for which the database 116 includes an associated answer. For example, the second group of questions may include all of the questions 118 for which the database 116 does not include an associated answer. Illustratively, the server computer 110 may know the answer to the questions of the first group of questions and may not know the answer to the questions of the second group of questions.

According to various aspects, a question of the questions 118 may be a question regarding a name of a point of interest, a location of a point of interest, an item on a menu (e.g. in a restaurant, e.g., in a bar), a price of an item on a menu (e.g. in a restaurant, e.g., in a bar), opening times (e.g., of a museum, e.g., of a shop, e.g., of a library, e.g. of a restaurant, e.g., of a bar, etc.), price of parking per hour, an indoor direction between two points of interest, an outdoor direction between points of interest, if indoor seating is possible, if outdoor seating is possible, if credit cards are accepted, if debit cards are accepted, etc.

According to various aspects, a question of the questions 118 may be a dichotomous question (e.g., a Yes/No question, e.g., a True/False question), a multiple choice question, a checkbox question, a slider question (e.g., a question which involves sliding a slider for a numerical value (e.g., a numerical value between 1 and 10)), a question which involves taking a photo using the user device (e.g., using a camera of the user device), or a type-in question (e.g., a comment box questions, e.g., a question a user is asked to type in an answer).

Figure 2B:
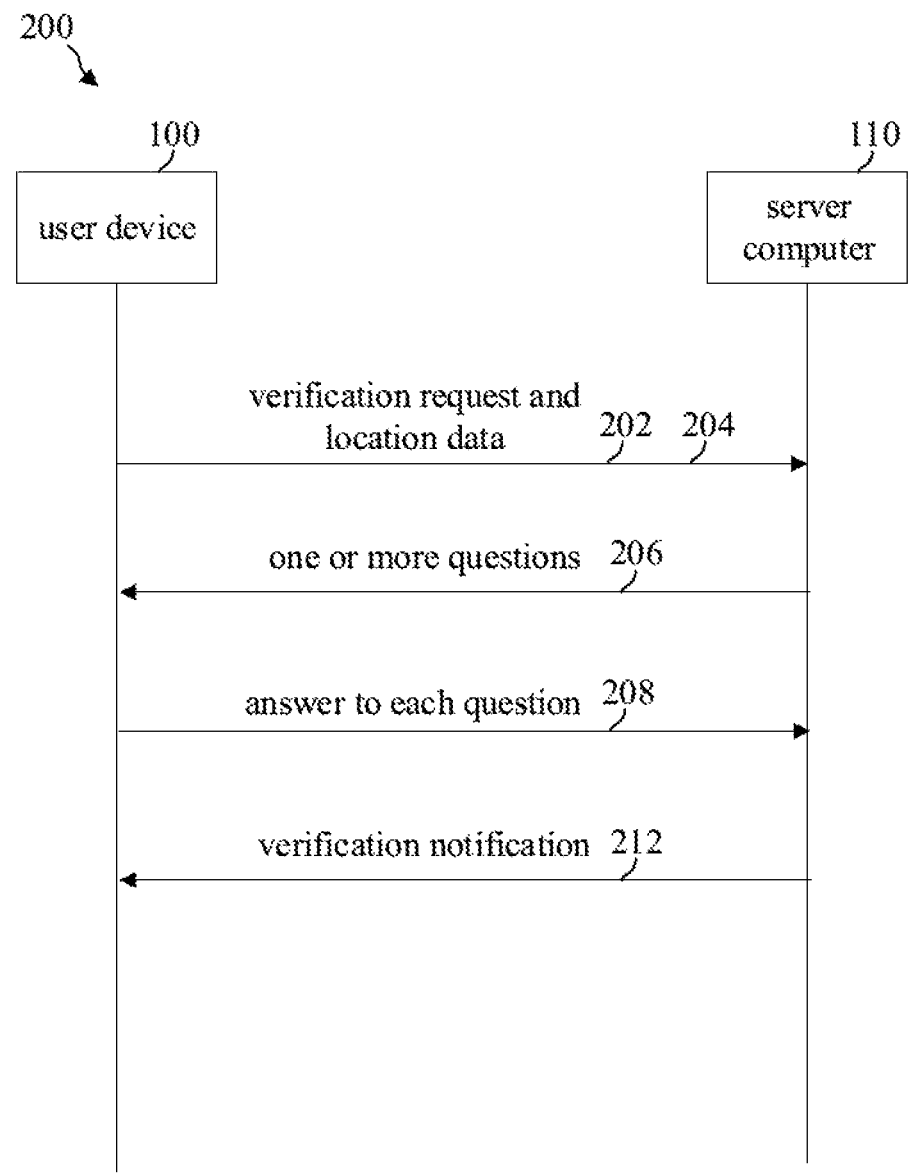
Figure 3:
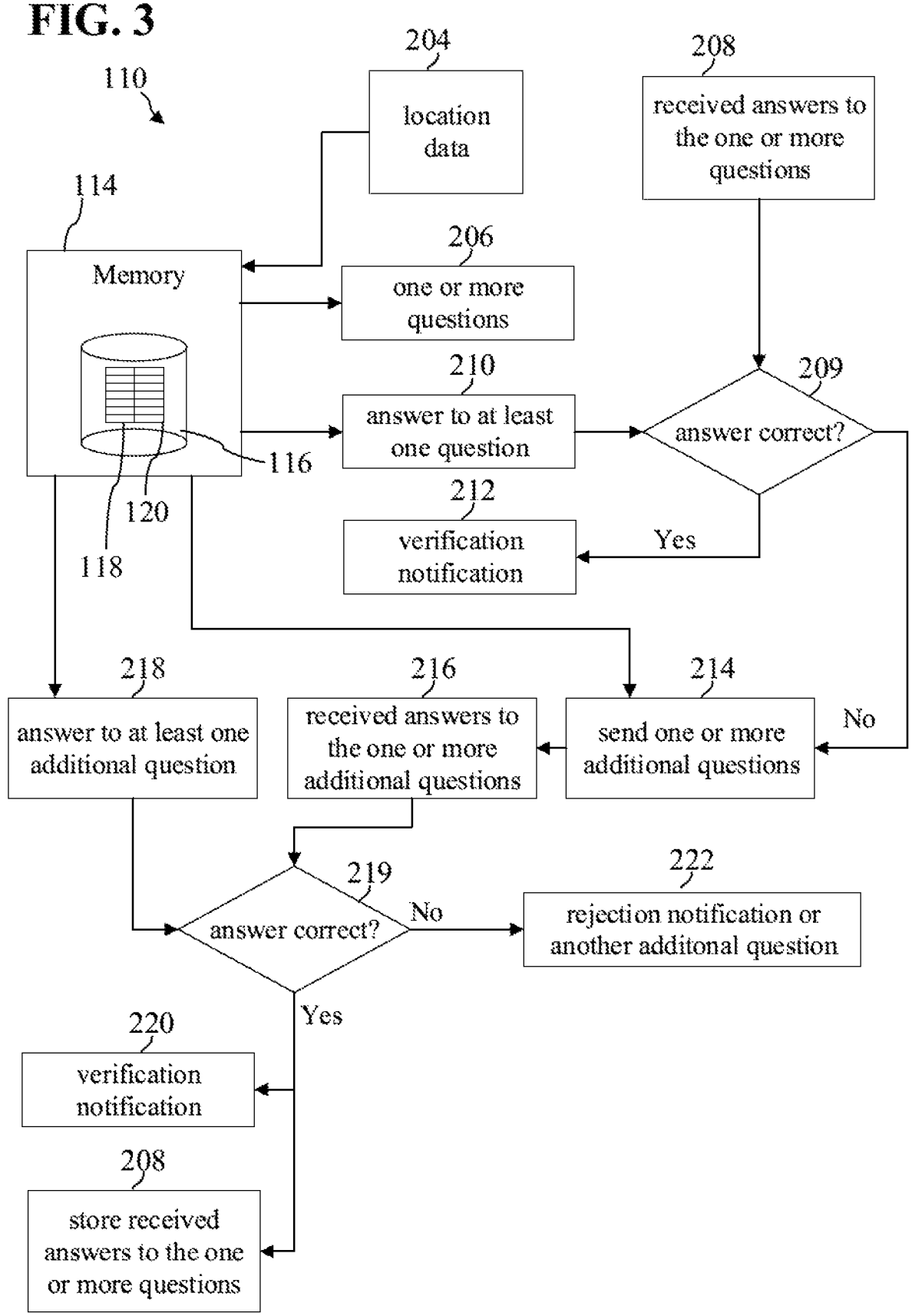
FIG. 3 shows an exemplary processing system performed by the server computer to verify a location of the user device or not.

FIG. 2A, FIG. 2B, and FIG. 2C each show an exemplarity communication system 200 (in some aspects referred to as verification procedure) between the user device 100 and the server computer 110 for verifying a location of the user device 100, according to various aspects. FIG. 3 shows an exemplary processing system performed by the server computer 110 to verify a location of the user device 100, according to various aspects.

According to various aspects, the communication may be initiated by the user device 100. For example, the user using the user device 100 may initiate a function (e.g., in the app) which requires a verification of the location of the user device 100. For example, the user may initiate a function for submitting information regarding a point of interest to the server computer 110.

With respect to FIG. 2A, the server computer 110 may be configured to transmit a verification request 202 to the user device 100 in response to the initiation of the function. According to various aspects, the user device 100 may be configured to obtain location data (e.g., GPS data) of the user device 100 using the positioning sensor 108. The user device 100 may be configured to transmit the obtained location data 204 (e.g., via the communication interface) to the server computer 110.

With respect to FIG. 2B, the user device 100 may be configured to obtain location data (e.g., GPS data) of the user device 100 using the positioning sensor 108 in response to the initiation of the function. According to various aspects, the user device 100 may be configured to transmit a verification request 202 and the obtained location data 204 (e.g., via the communication interface) to the server computer 110.

The server computer 110 may receive the location data 204. The server computer 110 may be configured to select one or more questions 206 of the questions 118 included in the database 116 associated with the location data (or location). According to various aspects, the server computer 110 may be configured to select the one or more questions 206 such that the one or more questions 206 are not easily accessible remotely (e.g., on the internet). As used herein, the term "easily accessible remotely" may, for example, refer to questions for which an answer may not be found easily using popular search engines. For example, a question to an answer may not be found easily, if the answer cannot be found on a predefined number of first pages of search results (e.g., cannot be found on the first page of the search results, e.g., cannot be found on the first page and second page of the search results, e.g., cannot be found on the first page, second page, and third page of the search results, etc.).

According to various aspects, the server computer 110 may be configured to select the one or more questions 206 such that the database 116 includes an answer 210 to at least one question of the one or more questions 206. According to various aspects, the server computer 110 may be configured to determine, if the one or more questions 206 are easily accessible on the internet. For example, the server computer 110 may check one or more popular search engines (e.g., search engines popular in the region associated with the location data), if an answer to a question may be found easily (e.g., on the first few pages of the search results). According to various aspects, the server computer 110 may be configured to select the one or more questions 206 such that an answer cannot be found on the first few (e.g., the first, e.g., the first and the second, e.g., the first, the second, and the third, etc.) search result pages of each of the one or more popular search engines. According to various aspects, the server computer 110 may be configured to select the one or more questions 206 such that an answer cannot be found within a predefined number of search results. For example, the one or more questions 206 may be selected such that an answer cannot be found within in the first ten, within the first hundred, within the first thousand search result of each of the one or more popular search engines (e.g., search engines popular in the location).

The user device 100 may be configured to provide the one or more questions 206 (e.g., via the user interface 102) to the user. The user may answer each of the one or more questions 206. In response to the user answering the one or more questions, the user device 100 may be configured to transmit the answers 208 (e.g., the answer to each question) to the server computer 110. Illustratively, the server computer 110 and the user device 100 may perform a challenge-response communication. Illustratively, the one or more questions may be provided to a user using the user device 100 similar to a captcha. Thus, the verification procedure, as described herein, may be a location-based captcha procedure.

The server computer 110 may be configured to compare the answer 208 provided by the user device 100 to the at least one question with the answer 210 of the at least one question included (e.g., stored) in the database 116. According to various aspects, the server computer 110 may be configured to determine 209, if the answer 208 provided by the user device 100 to the at least one question corresponds to the answer 210 of the at least one question included in the database 116. In an illustrative example, the one or more questions 206 include at least one question which involves taking a photo using the user device (e.g., the user device may include a camera configured to acquire a photo of a surrounding of the user device), the user device 100 may be configured to transmit the photo as part of the answer 208 to the at least one question, which involves taking the photo, to the server computer 110, and the server computer 110 may be configured to compare the answer 208 provided by the user device 100 to the at least one question with the answer 210 of the at least one question included (e.g., stored) in the database 116. For example, the answer 210 included in the database 116 may be linked to a photo stored in the memory 114 and the server computer 110 may be configured to determine a similarity between the photo provided by the user device 100 and the photo stored in the memory 114.

The server computer 110 may be configured to, if the answer 208 provided by the user device 100 corresponds to the answer 210 included in the database 116, verify the location of the user device 100 represented by the location data. The server computer 110 may be configured to, if the answer 208 provided by the user device 100 corresponds to the answer 210 included in the database 116, transmit a verification notification 212 to the user device 100 (see, for example, FIG. 2A, FIG. 2B, FIG. 3). For example, the verification notification 212 may allow (e.g., give access) the user device 100 (e.g., the app) to perform the initiated function.

The server computer 110 may be configured to, if the answer 208 provided by the user device 100 does not correspond to the answer 210 included in the database 116, transmit one or more additional questions 214 associated with the location data 204 to the user device 100. The one or more additional questions 214 may be selected such that the database 116 includes an answer 218 to at least one additional question. Similar to the one or more questions 206, the server computer 110 may be configured to transmit the one or more additional questions 214 to the user device 100 and the user device 100 may be configured to transmit an answer 216 to each of the one or more additional questions 214.

According to various aspects, the server computer 110 may be configured to determine 219, if the answer 216 provided by the user device 100 to the at least one additional question corresponds to the answer 218 of the at least one additional question included in the database 116.

The server computer 110 may be configured to, if the answer 216 provided by the user device 100 corresponds to the answer 218 included in the database 116, verify the location of the user device 100 represented by the location data. The server computer 110 may be configured to, if the answer 216 provided by the user device 100 corresponds to the answer 218 included in the database 116, transmit a verification notification 220 to the user device 100 (see, for example, FIG. 2C, FIG. 3).

The server computer 110 may be configured to, if the answer 216 provided by the user device 100 does not correspond to the answer 218 included in the database 116, either transmit again one or more additional question 222 associated with the location different from the one or more questions 206 and the one or more additional questions 214, or transmit a rejection notification 222 to the user device 100. The rejection notification 222 may inform the user device (e.g., the user using the user device 100) that the verification procedure failed.

According to various aspects, the server computer 110 may be configured to, if the answer 216 provided by the user device 100 corresponds to the answer 218 included in the database 116, store the answers 208 received from the user device 100 to the one or more questions 206 (see, for example, FIG. 3).

Figure 4B:
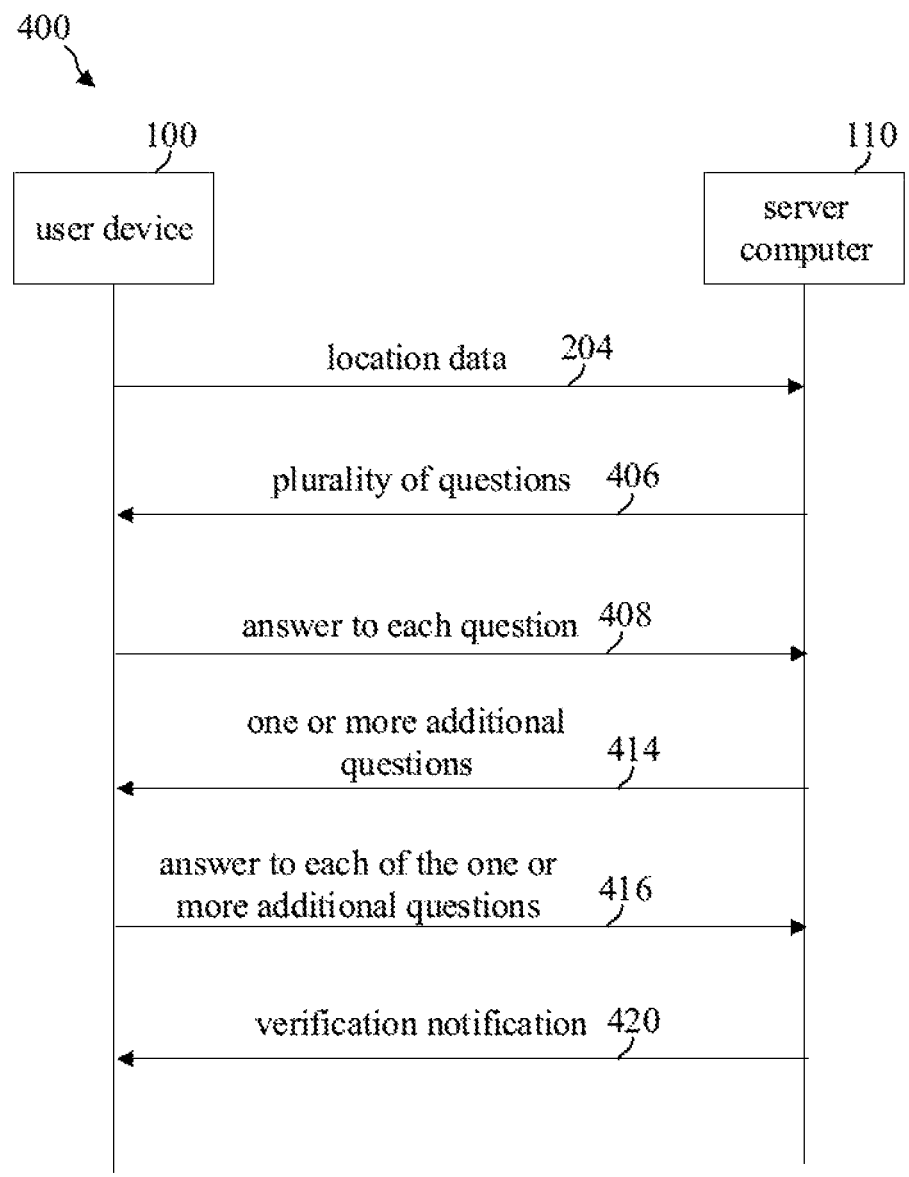
Figure 5:
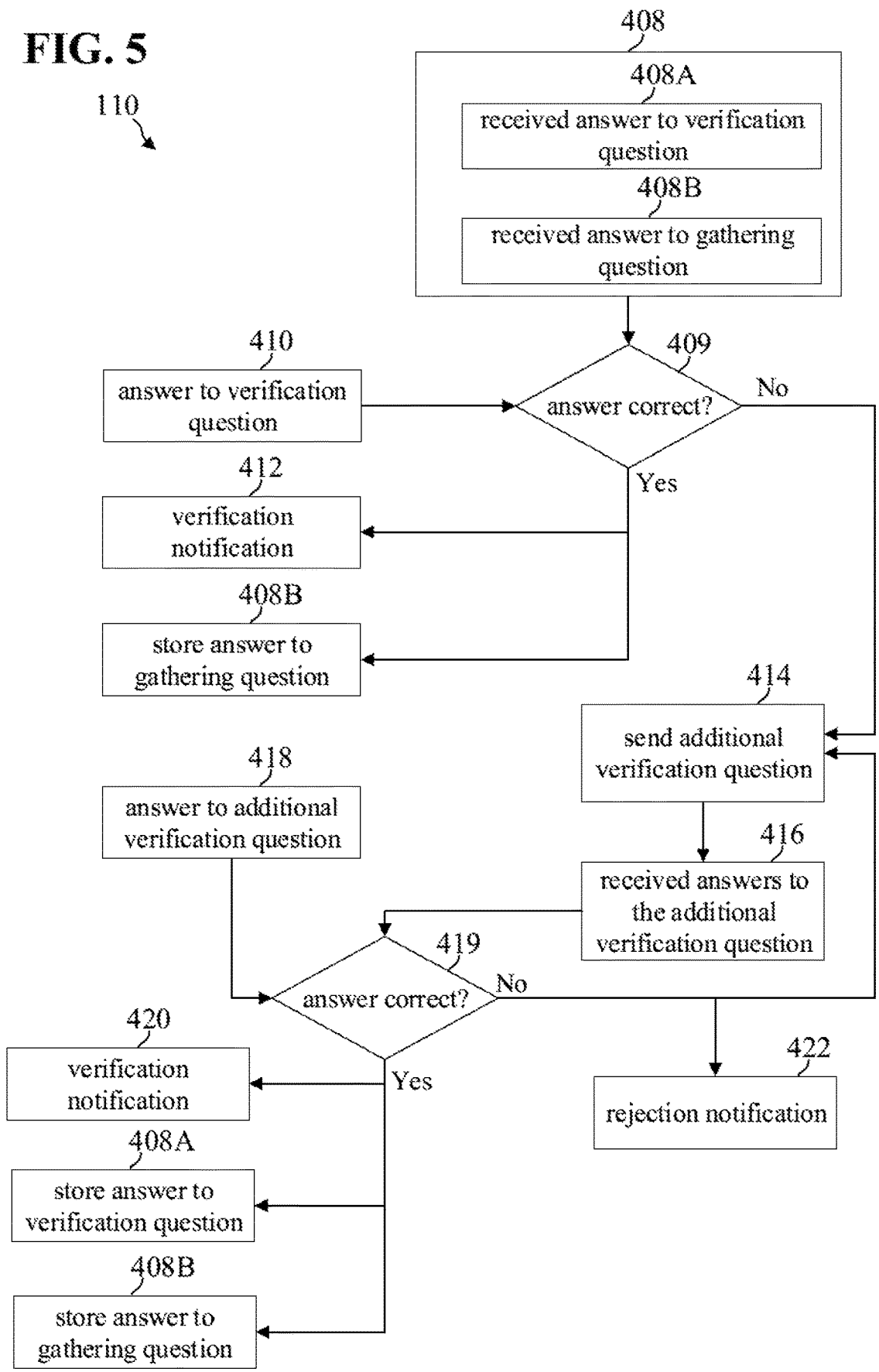
FIG. 5 shows an exemplary processing system performed by the server computer to verify a location of the user device or not.

FIG. 4A and FIG. 4B each show an exemplary communication system 400 (in some aspects referred to as verification procedure) between the user device 100 and the server computer 110 for verifying a location of the user device 100, according to various aspects. FIG. 5 shows an exemplary processing system performed by the server computer 110 to verify a location of the user device 100, according to various aspects. The exemplary communication system 400 may correspond substantially to the communication system 200, wherein the one or more questions 206 are a plurality of questions 406. The exemplary processing system shown in FIG. 5 may correspond substantially to the exemplary processing system shown in FIG. 3, wherein the one or more questions 206 are a plurality of questions 406.

According to various aspects, the plurality of questions 406 (e.g., including two questions, e.g., including more than two questions) may include at least one verification question (e.g., one verification question, e.g., two verification questions, e.g., more than two verification questions). The at least one verification question may correspond to the at least one question in that the database 116 may include an answer 410 to the verification question. According to various aspects, the plurality of questions 406 may include at least one gathering question (e.g., one gathering question, e.g., two gathering questions, e.g., more than two gathering questions). The gathering question may be selected such that the database 116 does not include an answer to the at least one gathering question. Illustratively, the gathering question may be asked to obtain an answer to the gathering question.

As used herein, the term "verification question" may relate to a question included in the database 116 for which an associated answer is included in the database 116.

As used herein, the term "gathering question" may relate to a question included in the database 116 for which no associated answer is included in the database 116. According to various aspects, a gathering question may be associated with preliminary answers. A preliminary answer may be, for example, an answer provided by another user to the gathering questions. A preliminary answer may be, for example, an unproved answer provided by a crowdsourcing agent.

In the following, the communication system 400 and the processing system are described exemplarily for one verification question and one gathering question.

The server computer 110 may transmit the plurality of questions 406 to the user device 100 and may receive an answer 408 to each question of the plurality of questions 406. Hence, received answers 408 may include an answer 408A to the verification question and an answer 408B to the gathering question. A type (e.g., verification question, e.g., gathering question) of the plurality of questions 406 may be unknown to the user using the user device 100. Hence, the user is expected answer all of the plurality of questions 406 to their best knowledge.

The server computer 110 may determine 409, if the received answer 408A to the verification question corresponds to the answer 410 of the verification question included in the database 116.

The server computer 110 may, if the received answer to the verification question 408A corresponds to the answer 410 of the verification question included in the database 116 ("Yes" in 409 of FIG. 5), transmit a verification notification 412 to the user device 100 (see, for example, FIG. 4A, FIG. 5). The server computer 110 may, if the received answer 408A to the verification question corresponds to the answer 410 of the verification question included in the database 116, store the received answer 408B to the gathering question in the database 116. According to various aspects, the server computer 110 may, if the received answer 408A to the verification question corresponds to the answer 410 of the verification question included in the database 116, store the received answer 408B to the gathering question as a preliminary gathering answer in the database 116. According to various aspects, the server computer 110 may be configured to determine, if other preliminary gathering answers included in the database 116 in associated with the gathering question and provided by other users (i.e., users different from the user using the user device 100) are similar (e.g., identical) to the preliminary gathering answer. For example, preliminary gathering answers may be similar to each other if they are identical except for a predefined number of digits or letters. For example, preliminary gathering answers may be similar to each other if they are identical except for one letter. According to various aspects, the server computer 110 may be configured to, if other preliminary gathering answers associated with the gathering question are similar to the preliminary gathering answer, determine if a weighted number of similar preliminary gathering answers is above a predefined threshold value. Each preliminary gathering answer may be associated with a weighting value. According to various aspects, the weighting value may represent a trustworthiness of a user or user device that provided the respective preliminary gathering answer. For example, the weighted number of similar preliminary gathering answers may be a sum of the respective weighting values associated with the similar preliminary gathering answers. Illustratively, a user who already provided a high number of correct answers may have a higher weighting value than a user who never provided a correct answer. According to various aspects, each user device may be associated with a weighting value equal to "1" such that the weighted number of similar preliminary gathering answers may be a total number of similar preliminary gathering answers. According to various aspects, any other type of consensus-mechanism may be employed to determine whether a preliminary gathering answer is trustworthy or not. According to various aspects, the server computer 110 may be configured to, if the weighted number of similar preliminary gathering answers is above the predefined threshold value, store the preliminary gathering answer as an answer associated with the gathering question in the database 116. Illustratively, an answer provided by the user to the gathering question may be compared with answers provided by other users to the same gathering question and, if a specific amount of users provides the similar (e.g., identical) answers to the same question, the answer to the question is stored in the database 116. Illustratively, the gathering question may then be associated with an answer, so that the gathering question may be provided as a verification question to another user. Thus, new data (i.e., unknown answers to gathering questions) may be generated in parallel to the verification procedure increasing the number of verification questions and, hence, enhancing the verification procedure.

The server computer 110 may, if the received answer 408A to the verification question does not correspond to the answer 410 of the verification question included in the database 116 ("No" in 409 of FIG. 5), transmit one or more additional questions included in the database 116 and associated with the location data 204 to the user device 100. The one or more additional questions may include at least one additional verification question 414 (e.g., different from the previously transmitted verification question) (see, for example, FIG. 4B, FIG. 5). The database 116 may include an answer 418 to the at least one additional verification question. In the following, the communication system 400 and the processing system are described exemplarily for one additional verification question 414.

The user device 100 may transmit an answer to each of the one or more additional questions including an answer 416 to the additional verification question 414. The server computer 110 may determine 419, if the received answer 416 to the additional verification question 414 corresponds to the answer 418 of the additional verification question 414 included in the database 116.

According to various aspects, the server computer 110 may be configured to, if the received answer 416 to the additional verification question 414 corresponds to the answer 418 of the additional verification question 414 included in the database 116 ("Yes" in 419 of FIG. 5), transmit a verification notification 420 to the user device 100 (see, for example, FIG. 4B, FIG. 5). The server computer 110 may, if the received answer 416 to the additional verification question 414 corresponds to the answer 418 of the additional verification question 414 included in the database 116, store the received answer 408B to the gathering question in the database 116 in association with the gathering question. According to various aspects, the server computer 110 may store the received answer 408B to the gathering question as a preliminary gathering answer in the database 116, may determine, if other preliminary gathering answers included in the database 116 in associated with the gathering question and provided by other users are similar (e.g., identical) to the preliminary gathering answer, and may determine, if the weighted number (e.g., total number) of similar preliminary gathering answers is above a first predefined threshold value, as described above. The server computer 110 may be configured to, if the received answer 416 to the additional verification question 414 corresponds to the answer 418 of the additional verification question 414 included in the database 116, store the received answer 408A to the verification question in the database 116 in associated with the verification question. According to various aspects, the server computer 110 may be configured to store the received answer 408A to the verification question as a preliminary verification answer in the database 116. According to various aspects, the server computer 110 may be configured to determine, if other preliminary verification answers included in the database 116 in associated with the verification question and provided by other users (i.e., users different from the user using the user device 100) are similar (e.g., identical) to the preliminary verification answer. For example, preliminary verification answers may be similar to each other if they are identical except for a predefined number of digits or letters. According to various aspects, the server computer 110 may be configured to, if other preliminary verification answers associated with the verification question are similar to the preliminary verification answer, determine if a weighted number (e.g., a total number) of similar preliminary verification answers is above a second predefined threshold value. According to various aspects, the server computer 110 may be configured to, if the weighted number (e.g., the total number) of similar preliminary verification answers is above the second predefined threshold value, store the preliminary verification answer as an answer associated with the verification question in the database 116. Illustratively, an answer 408A provided by the user to the verification question may be compared with answers provided by other users to the same verification question and, if a specific amount of users provides the similar (e.g., identical) answers to the same question, the answer to the question is stored in the database 116. Illustratively, the answer associated with the verification question may then be adapted (e.g., changed, e.g., modified), so that the verification question is then associated with another answer. Illustratively, the current answer stored in the database 116 in associated with the verification question is changed to the new determined answer. Thus, changes to currently stored answers associated with respective questions may be considered. For example, a verification question may be a price of an item on a menu. However, the price the item may change over time. If the price of the item changes, an answer of a user including the new price may be expected to be wrong and an additional (different) verification question may be sent to the user. If the user answers the additional verification question correctly, the answer to the prior verification question may be stored as a preliminary answer and if a plurality (e.g., two or more, e.g., three or more) of users submit the same answer (i.e., the same new price of the item on the menu), it is expected that the price of the item has changed. Thus, changes (e.g., price changes) to questions may be considered.

According to various aspects, the one or more additional questions may include at least one additional gathering question (e.g., different from the previously transmitted gathering question). In this case, the server computer 110 may be configured to, if the received answer 416 to the additional verification question 414 corresponds to the answer 418 of the additional verification question 414 included in the database 116, store the received answer to the additional gathering question in the database 116 in association with the additional gathering question. For example, the server computer 110 may store the received answer to the additional gathering question as a preliminary gathering answer in the database 116 in association with the additional gathering question.

According to various aspects, the server computer 110 may be configured to, if the received answer to the additional verification question 414 does not correspond to the answer 418 of the verification question included in the database 116, either send another additional verification question (e.g., repeating in 414, whereas a different verification question is selected) or send a rejection notification 422 to the user device 100 (e.g., to reject access to the initiated function, e.g., to not verify the location of the user device 100).

Figure 6:
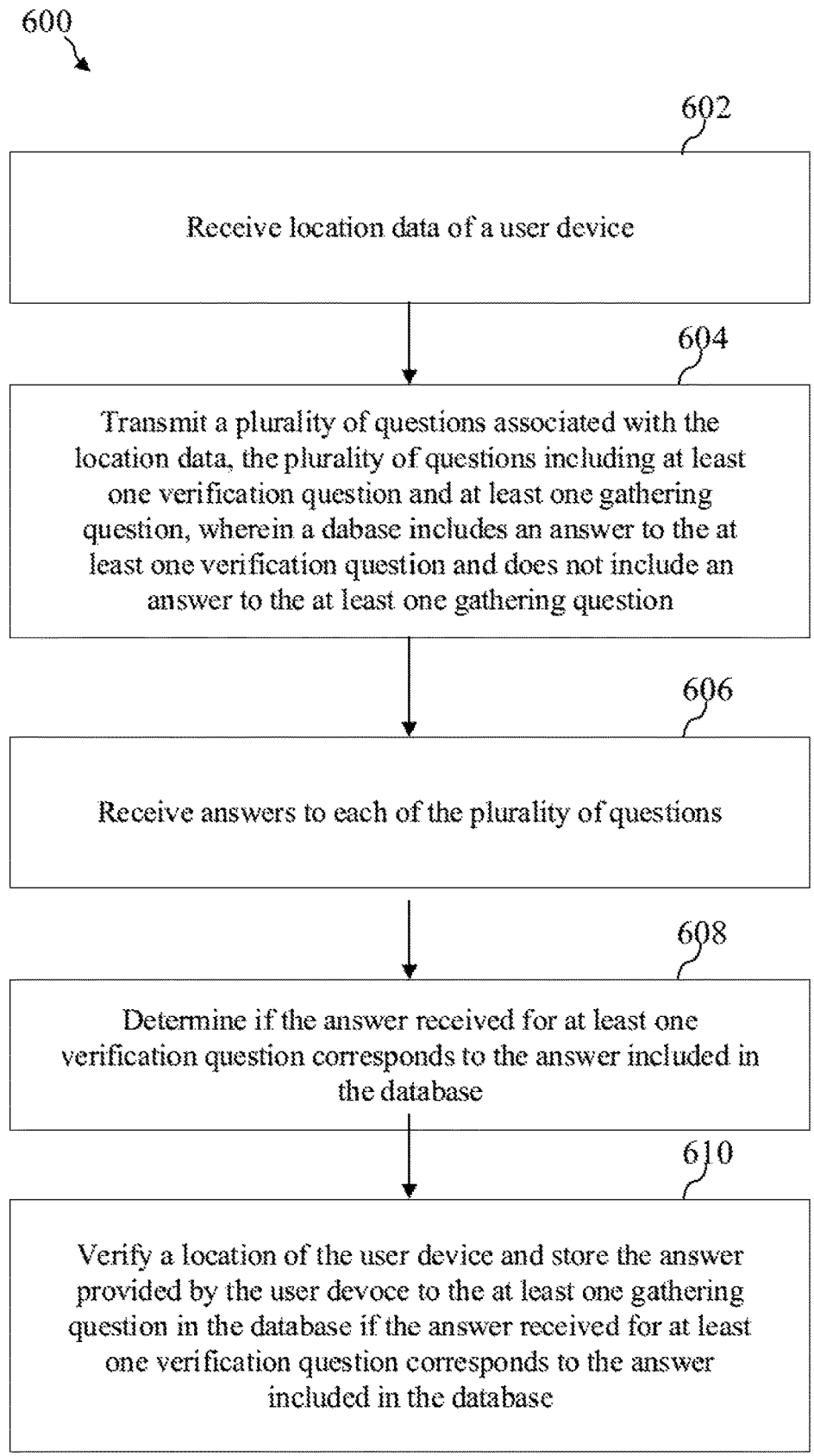
FIG. 6 shows a flow diagram illustrating a method for verifying a location of a user device according to various embodiments.

FIG. 6 shows a flow diagram 600 illustrating a method for verifying a location of a user device using a server computer.

In 602, the server computer may receive location data from the user device. The location data may represent a location of the user device.

In 604, the server computer may transmit a plurality of questions associated with the location data to the user device. The server computer may store a database including each of the plurality of questions. The plurality of questions may include at least one verification question and at least one gathering question. The database may include an answer to the at least one verification question and may not include an answer to the at least one gathering question.

In 606, the server computer may receive an answer to each of the plurality of questions from the user device.

In 608, the server computer may, for the at least one verification question, determine if the answer provided by the user device (e.g., received form the user device) corresponds to the answer included in the database.

In 610, the server may, if the answer provided by the user device to the at least one verification questions corresponds to the answer of the at least one verification question included in the database, verify the location of the user device represented by the received location data and may store the answer provided by the user device to the at least one gathering question in the database in association with the at least one gathering question.

The method of FIG. 6 may be carried out by a server computer as illustrated in FIG. 4A and/or FIG. 4B.

Various aspects related to methods (e.g., verification procedures) for verifying a location of a user device using a server computer, which is fraud proof (e.g., very hard to fake) and provides a high level of accuracy in verifying a location of a user device. Further, in addition to verifying the location of the user device, additional information (e.g., additional verification questions) may be generated in parallel. According to various aspects, gathering questions and a respective gathering answer may be provided by a crowdsourcing agent. However, the gathering answer provided to a gathering question may be considered as an unproved answer and answers to the gathering questions may be checked (e.g., approved, e.g., rejected) using the methods described herein. Further, the methods may be advantageous in that (e.g., in the case an app is used) no access to a camera of the user device and/or WiFi data may be necessary. According to various aspects, a user may submit a point of interest (POI) once the location of the user device has been verified. This POI submission may be included to the database 116 as a gathering question associated with a preliminary answer. The gathering question may be transmitted to other users for checking the preliminary answer. For example, a user may submit a POI "Raja Restaurant" associated with the location of the user device. Other users at the same location may receive the gathering question "Is this Raja Restaurant" as a Yes/No gathering question. Once a predefined number of different users verify the POI "Raja Restaurant" (e.g., by submitting "Yes" to the gathering question and/or by also submitting the POI "Raja Restaurant" subsequent to verifying their location), the POI may be expected to be correct. According to various aspects, the POI may then (once expected to be correct) be used as a verification questions for users requesting a verification of their location.

The methods (e.g., verification procedures) described herein may be performed and the various processing or computation units and devices described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A server computer for verifying a location of a user device, the server computer comprising:
   a memory interface connected to a memory device, the memory device configured to store a database comprising a plurality of verification questions and a plurality of gathering questions, wherein each question of the plurality of verification questions and the plurality of gathering questions is associated with a location of a plurality of locations, wherein the database comprises an answer to each of the plurality of verification questions, the answer provided by a different user device than the user device, and wherein the database does not comprise an answer to each of the plurality of gathering questions;
   a communication interface configured to receive data from the user device and to transmit data to the user device; and
   a processing unit configured to:
      receive location data from the user device via the communication interface, the location data representing the location of the user device;
      select at least one verification question from the plurality of verification questions and at least one gathering question from the plurality of gathering questions associated with the location of the user device represented by the location data from the database via the memory interface;
      transmit the at least one verification question and the at least one gathering question to the user device and receive an answer provided by the user device to each of the at least one verification question and the at least one gathering question from the user device via the communication interface;

for the at least one verification question, determine if the answer provided by the user device corresponds to the answer comprised in the database;

if the answer provided by the user device to the at least one verification question corresponds to the answer of the at least one verification question comprised in the database, verify the location of the user device represented by the received location data, store the answer provided by the user device to the at least one gathering question in the database of the memory device in association with the at least one gathering question, and use the at least one gathering question as a verification question to another user; and if the answer provided by the user device to the at least one verification question does not correspond to the answer of the at least one verification question comprised in the database;

select one or more additional questions associated with the location of the user device represented by the location data from the database via the memory interface, wherein the one or more additional questions comprise at least one additional verification question selected from the plurality of verification questions;

transmit the one or more additional questions to the user device and receive an answer provided by the user device to each of the one or more additional questions from the user device via the communication interface;

for the at least one additional verification question, determine, if the answer provided by the user device corresponds to the answer comprised in the database; and if the answer provided by the user device to the at least one additional verification question corresponds to the answer of the at least one additional verification question comprised in the database, verify the location of the user device represented by the received location data.

2. The server computer of claim 1, wherein the plurality of verification questions and/or the plurality of gathering questions comprise one or more questions regarding an attribute of a map.

3. The server computer of claim 1, wherein the processing unit is configured to:

if the answer provided by the user device to the at least one verification question corresponds to the answer of the at least one verification question comprised in the database, store the answer provided by the user device to the at least one gathering question as a preliminary gathering answer in the database via the memory interface;

determine, if other preliminary gathering answers comprised in the database of the memory device in association with the at least one gathering question and provided by other users are similar to the preliminary gathering answer;

if other preliminary gathering answers associated with the at least one gathering question are similar to the preliminary question, determine, if a weighted number of similar preliminary gathering answers is above a threshold value; and if the determined weighted number of similar preliminary gathering answers is above the threshold value, store the preliminary gathering answer via the memory interface as an answer associated with the at least one gathering question in the database in association with the at least one gathering question.

4. The server computer of claim 3, wherein the processing unit is further configured to:

if the answer provided by the user device to the at least one additional verification question corresponds to the answer of the at least one additional verification question comprised in the database, store the answer provided by the user device to the at least one gathering question via the memory interface in the database of the memory device in association with the at least one gathering question.

5. The server computer of claim 4, wherein the processing unit is configured to:

if the answer provided by the user device to the at least one additional verification question corresponds to the answer of the at least one additional verification question comprised in the database, store the answer provided by the user device to the at least one gathering question via the memory interface as a preliminary gathering answer in the database of the memory device;

determine, if other preliminary gathering answers comprised in the database in association with the at least one gathering question and provided by other users are similar to the preliminary gathering answer;

if other preliminary gathering answers associated with the at least one gathering question are similar to the preliminary gathering answer, determine, if a weighted number of similar preliminary gathering answers is above a first threshold value; and if the determined weighted number of similar preliminary gathering answers is above the first threshold value, store the preliminary gathering answer as an answer associated with the at least one gathering question via the memory interface in the database of the memory device.

6. The server computer of claim 3, wherein the one or more additional questions further comprise at least one additional gathering question selected from the plurality of gathering questions; wherein the processing unit is further configured to:

if the answer provided by the user device to the at least one additional verification question corresponds to the answer of the at least one additional verification question comprised in the database, store the answer provided by the user device to the at least one additional gathering question via the memory interface in the database of the memory device in association with the at least one additional gathering question.

7. The server computer of claim 6, wherein the processing unit is configured to:

if the answer provided by the user device to the at least one additional verification question corresponds to the answer of the at least one additional verification question comprised in the database, store the answer provided by the user device to the at least one additional gathering question via the memory interface as a preliminary gathering answer in the database of the memory device;

determine, if other preliminary gathering answers comprised in the database in association with the at least one additional gathering question and provided by other users are similar to the preliminary gathering answer;

if other preliminary gathering answers associated with the at least one additional gathering question are similar to the preliminary gathering answer, determine, if a weighted number of similar preliminary gathering answers is above a first threshold value; and if the determined weighted number of similar preliminary gathering answers is above the first threshold value, store the preliminary gathering answer as an answer associated with the at least one additional gathering question in the database of the memory device.

8. The server computer of claim 1, wherein the processing unit is further configured to:

if the answer provided by the user device to the at least one additional verification question corresponds to the answer of the at least one additional verification question comprised in the database, store the answer provided by the user device to the at least one verification question via the memory interface as a preliminary verification answer in the database of the memory device;

determine, if other preliminary verification answers comprised in the database in association with the at least one verification question and provided by other users are similar to the preliminary verification answer;

if other preliminary verification answers associated with the at least one verification question are similar to the preliminary verification answer, determine, if a weighted number of similar preliminary verification answers is above a second threshold value; and if the determined weighted number of similar preliminary verification answers is above the second threshold value, store the preliminary verification answer as an answer associated with the at least one verification question via the memory interface in the database of the memory device.

9. The server computer of claim 8, wherein the processing unit is configured to store the preliminary verification answer as an answer associated with the at least one verification question in the database of the memory device such that the answer currently comprised in the database in association with the at least one verification question is replaced with the answer to the at least one verification question received from the user device.

10. The server computer of claim 1, wherein the processing unit is further configured to:

if the answer provided by the user device to the at least one additional verification question does not correspond to the answer of the at least one additional verification question comprised in the database, transmit a rejection notification to the user device rejecting a requested verification of the location of the user device or transmit one or more other verification questions of the plurality of verification questions associated with the location of the user device to the user device via the communication interface.

11. The server computer of claim 1, wherein the processing unit is further configured to:

if the location of the user device is verified, transmit a verification notification to the user device via the communication interface verifying the location of the user device represented by the received location data.

12. The server computer of claim 1, wherein the plurality of verification questions and/or the plurality of gathering questions comprise one or more of a dichotomous question, a checkbox question, a slider question, a question which involves taking a photo using the user device, and/or a type-in question.

13. A system comprising a server computer for verifying a location of a user device, the server computer comprising:

a memory interface connected to a memory device, the memory device configured to store a database comprising a plurality of verification questions and a plurality of gathering questions, wherein each question of the plurality of verification questions and the plurality of gathering questions is associated with a location of a plurality of locations, wherein the database comprises an answer to each of the plurality of verification questions, and wherein the database does not comprise an answer to each of the plurality of gathering questions;

a communication interface configured to receive data from the user device and to transmit data to the user device; and a processing unit configured to:

receive location data from the user device via the communication interface, the location data representing the location of the user device;

select at least one verification question from the plurality of verification questions and at least one gathering question from the plurality of gathering questions associated with the location of the user device represented by the location data from the database via the memory interface;

transmit the at least one verification question and the at least one gathering question to the user device and receive an answer provided by the user device to each of the at least one verification question and the at least one gathering question from the user device via the communication interface;

for the at least one verification question, determine if the answer provided by the user device corresponds to the answer comprised in the database, the answer comprised in the database received from a different user device than the user device;

if the answer provided by the user device to the at least one verification question corresponds to the answer of the at least one verification question comprised in the database, verify the location of the user device represented by the received location data, store the answer provided by the user device to the at least one gathering question in the database of the memory device in association with the at least one gathering question, and use the at least one gathering question as a verification question to another user; and if the answer provided by the user device to the at least one verification question does not correspond to the answer of the at least one verification question comprised in the database:

select one or more additional questions associated with the location of the user device represented by the location data from the database via the memory interface, wherein the one or more additional questions comprise at least one additional verification question selected from the plurality of verification questions;

transmit the one or more additional questions to the user device and receive an answer provided by the user device to each of the one or more additional questions from the user device via the communication interface;

for the at least one additional verification question, determine, if the answer provided by the user device corresponds to the answer comprised in the database; and if the answer provided by the user device to the at least one additional verification question corresponds to the answer of the at least one additional verification question comprised in the database, verify the location of the user device represented by the received location data; and the user device comprising:
- a positioning sensor configured to acquire the location data;
- a communication interface configured to transmit the location data to the server computer and to receive the respective questions from the server computer; and
- a user interface configured to provide the received questions to a user using the user device and to receive the answers provided by the user.

14. A method for verifying a location of a user device using a server computer, the method comprising:

receiving, by the server computer, location data from the user device, the location data representing the location of the user device;

transmitting, by the server computer, a plurality of questions associated with the location data to the user device, wherein the server computer stores a database comprising each of the plurality of questions, the plurality of questions comprising at least one verification question and at least one gathering question, wherein the database comprises an answer to the at least one verification question, the answer provided by a different user device than the user device, and wherein the database does not comprise an answer to the at least one gathering question;

receiving, by the server computer, an answer to each of the plurality of questions from the user device;

for the at least one verification question of the plurality of questions, the server computer determining if the answer provided by the user device corresponds to the answer comprised in the database;

if the answer provided by the user device to the at least one verification question corresponds to the answer of the at least one verification question comprised in the database, the server computer verifying the location of the user device represented by the received location data, storing the answer provided by the user device to the at least one gathering question in the database in association with the at least one gathering question, and using the at least one gathering question as a verification question to another user; and if the answer provided by the user device to the at least one verification question does not correspond to the answer of the at least one verification question comprised in the database:

select one or more additional questions associated with the location of the user device represented by the location data from the database via the memory interface, wherein the one or more additional questions comprise at least one additional verification question selected from the plurality of verification questions;

transmit the one or more additional questions to the user device and receive an answer provided by the user device to each of the one or more additional questions from the user device via the communication interface;

for the at least one additional verification question, determine, if the answer provided by the user device corresponds to the answer comprised in the database; and if the answer provided by the user device to the at least one additional verification question corresponds to the answer of the at least one additional verification question comprised in the database, verify the location of the user device represented by the received location data.

* * * * *